United States Patent
Isayama et al.

(10) Patent No.: US 8,863,976 B2
(45) Date of Patent: Oct. 21, 2014

(54) SEAL STRUCTURE FOR FUEL TANK AND METHOD FOR FORMING SAME

(75) Inventors: Akira Isayama, Saitama (JP); Kotaro Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/814,261

(22) PCT Filed: Aug. 5, 2011

(86) PCT No.: PCT/JP2011/067939
§ 371 (c)(1),
(2), (4) Date: Feb. 5, 2013

(87) PCT Pub. No.: WO2012/018108
PCT Pub. Date: Feb. 9, 2012

(65) Prior Publication Data
US 2013/0134171 A1 May 30, 2013

(30) Foreign Application Priority Data
Aug. 6, 2010 (JP) ................. 2010-177421

(51) Int. Cl.
*B60K 15/05* (2006.01)
*B60K 15/03* (2006.01)
*F02M 37/00* (2006.01)

(52) U.S. Cl.
CPC . *B60K 15/03177* (2013.01); *B60K 2015/03447* (2013.01); *B60K 2015/03032* (2013.01); *B60K 2015/03453* (2013.01); *F02M 37/0017* (2013.01)
USPC ......................................... 220/562

(58) Field of Classification Search
USPC ......... 220/562, 795, 796, 582, 233, 234, 378, 220/643, 4.13, 4.14, 801–804, 806, 293, 220/295, 304; 277/628, 630, 637
See application file for complete search history.

(56) References Cited

U.S. PATENT DOCUMENTS

| | | | |
|---|---|---|---|
| 6,357,617 B1* | 3/2002 | Kido | 220/562 |
| 7,225,795 B2* | 6/2007 | Mills | 123/516 |
| 2005/0284871 A1* | 12/2005 | Leonard et al. | 220/562 |

(Continued)

FOREIGN PATENT DOCUMENTS

| | | |
|---|---|---|
| JP | 2001-140718 A | 5/2001 |
| JP | 2004-225669 A | 8/2004 |
| JP | 2007-237950 A | 9/2007 |

*Primary Examiner* — Fenn Mathew
*Assistant Examiner* — Robert Stodola
(74) *Attorney, Agent, or Firm* — Carrier Blackman & Associates, P.C.; Joseph P. Carrier; Fulchand P. Shende

(57) ABSTRACT

A lid member includes a tubular section housed inside an opening section, an external flange section closing the tubular section and extending therefrom across an outer boundary, and a seal-member mounting section extending downward from the edge of the external flange section and having a seal member. A flange-equipped sleeve includes a sleeve section attached to a neck section and an internal flange section extended from the sleeve section across the outer boundary and attached to an inner wall of the tank body. The flange-equipped sleeve contains a resin having a higher heat-resistant temperature than a resin constituting the tank body. When the lid member closes the opening section, the tubular section is housed inside the sleeve section. The external flange section contacts the top of the neck section and the sleeve section. An inner circumference of the seal member is attached to the outer boundary of the neck section.

4 Claims, 4 Drawing Sheets

(56) References Cited

U.S. PATENT DOCUMENTS

2006/0175335 A1* 8/2006 Easterday et al. ............ 220/378
2011/0260447 A1* 10/2011 Duval-Arnould ............. 285/220
2013/0313790 A1* 11/2013 Isayama et al. ............... 277/637

* cited by examiner

US 8,863,976 B2

SEAL STRUCTURE FOR FUEL TANK AND METHOD FOR FORMING SAME

TECHNICAL FIELD

The present invention relates to a seal structure for a fuel tank and a process for producing the seal structure.

BACKGROUND ART

A resin-made fuel tank in an automobile or other vehicles usually includes a fuel pump inside the tank. Fuel is made to pass through a fuel supply passage connected to the fuel pump, and is supplied to an engine from the fuel tank. The fuel tank has an opening section so as to install the fuel pump. After the fuel pump has been installed in the fuel tank, the opening section is sealed with, for example, a lid member through which the fuel supply passage penetrates. There are, however, some gaps between the above opening section and the lid member. Thus, there are provided various seal structures so as to prevent fuel leakage through such gaps.

For example, Patent Documents 1 and 2 disclose that a seal member or another member is disposed inside an opening section. In addition, Patent Document 3 discloses use of an outer wall thread for the opening section.

CITATION LIST

Patent Document

Patent Document 1: JP2004-225669A
Patent Document 2: JP2001-140718A
Patent Document 3: JP2007-237950A

SUMMARY OF INVENTION

Technical Problem

A resin-made fuel tank is generally produced by blow molding using a mold in view of its manufacturing cost and structural complexity. Unfortunately, the blow molding has reduced size precision on a surface not contacting a mold while keeping increased size precision on a surface contacting the mold. Accordingly, even if a seal member is disposed inside an opening section according to techniques disclosed in Patent Documents 1 and 2, the seal member may not properly function due to its reduced size precision. Thus, additional reinforcement must be provided. Specifically, when an opening section of a fuel tank is created by blow molding, a large gap between the opening section and a lid member is likely to occur. In order to completely seal such a gap, it is critical to precisely dispose the seal member. This makes a step of manufacturing the fuel tank complicated. Also, its manufacturing cost may increase.

In addition, a thread section, for example, may be provided as in the technique disclosed in Patent Document 3. In that case, the thickness of an opening section should be modified depending on whether the thread section on the outer wall of the opening section is a male or female type. This also makes its manufacturing step complicated, and makes its manufacturing cost increase. Furthermore, when a multi screw is disposed so as to more tightly fasten a tubular opening section, the opening section has a long height. A fuel tank having such an opening section occupies a substantially large volume in an automobile, etc.

The present invention has been conceived so as to solve the above problems. It is an object of the present invention to provide a seal structure for a fuel tank and a process for producing the seal structure, the size of which can be more precisely controlled and which can be readily produced.

Solution to Problem

The present inventors have conducted intensive research so as to resolve the above problems. As a result, a lid member is disposed via a flange-equipped sleeve inside an opening section of a fuel tank. In addition, a seal member, which is formed as an integral part of the lid member, is made to tightly attach to the outer surface of the opening section. By doing so, the present inventors have found out a seal structure for a fuel tank and a process for producing the seal structure. The size of the seal structure can be more precisely controlled, and the seal structure can be readily produced. Consequently, the present inventors have completed the present invention.

Specifically, an aspect of the present invention relates to a seal structure for a fuel tank including: a resin-made tank body containing an opening section having a neck section, the neck section protruding to an outside of the tank; a lid member closing the opening section; and a flange-equipped sleeve being interposed between the neck section and the lid member, wherein the lid member includes: a tubular section which is housed inside the opening section; an external flange section which closes the top of the tubular section and is extended from the tubular section across an outer boundary of the neck section; and a seal-member mounting section which is extended downward from an outer edge of the external flange section and holds an annular seal member; wherein the flange-equipped sleeve includes: a sleeve section which is attached to the neck section; and an internal flange section which is extended from the bottom of the sleeve section across the outer boundary of the neck section and is attached to an inner wall of the tank body; wherein the flange-equipped sleeve contains a resin having a higher heat-resistant temperature than a resin constituting the tank body; wherein when the lid member closes the opening section, the tubular section is housed inside the sleeve section; wherein the external flange section comes into contact with the top of the neck section and the sleeve section; and wherein an inner circumference of the seal member is attached to the outer boundary of the neck section.

Such a configuration of the seal structure for a fuel tank makes a fastening structure such as a thread section unnecessary. Accordingly, tightening torque and/or axial screw force during fastening do not have to be controlled. This helps achieve higher tight sealing performance. In addition, an easy-to-manage seal structure can be produced. Examples of the management include attachment and detachment of a lid member. Furthermore, the configuration can make the thickness of the opening section uniform and can make the fuel tank weigh light. Moreover, the size of the opening section can be precisely controlled.

At that occasion, a bottom section of the above tubular section preferably has a snap-fit structure, thereby interlocking the above bottom section with the above flange-equipped sleeve.

Such a configuration of the seal structure for a fuel tank helps avoid operation such as fastening when a thread section is provided. Only insertion of a lid member into an opening section makes it possible to seal the opening section. Consequently, the opening section of the fuel tank can be more easily and tightly sealed.

In addition, another aspect of the present invention relates to a process for producing a seal structure for a fuel tank, the process including the steps of: performing blow molding using a hat-shaped connecting member, a mold as produced to fit the connecting member into a predetermined position, and a resin to produce a tank body having the connecting member attached; and removing the tank body having the connecting member from the mold and cutting the connecting member, together with a wall section of the tank body, in parallel to a top face of the connecting member to produce an opening section of the tank body.

Because the process for producing the seal structure for a fuel tank has such steps, the size of the seal structure for a fuel tank can be more easily controlled and the seal structure can be more easily produced. Also, the size of the inner diameter of the opening section can be easily controlled. This makes it easier to design and produce a lid member which is inserted into the opening section. Furthermore, the thickness of the opening section can be made uniform, so that its manufacturing steps can be simplified.

Advantageous Effects of Invention

Embodiments of the present invention can provide a seal structure for a fuel tank and a process for producing the seal structure, the size of which can be more precisely controlled and which can be readily produced.

BRIEF DESCRIPTION OF DRAWINGS

FIG. 1 includes schematic diagrams illustrating a fuel tank having a seal structure according to the first embodiment.

FIG. 4 illustrates how to produce a seal structure for a fuel tank according to the first embodiment.

FIG. 5 represents an embodiment modified from the first embodiment.

DESCRIPTION OF EMBODIMENTS

The following describes embodiments of the present invention (hereinafter, appropriately referred to as "an embodiment") by referring to drawings. The embodiments, however, are not limited to the following contents, and thus can be carried out by modifying the embodiments within a scope not departing from the gist of the present invention.

First Embodiment

Figure 1A:
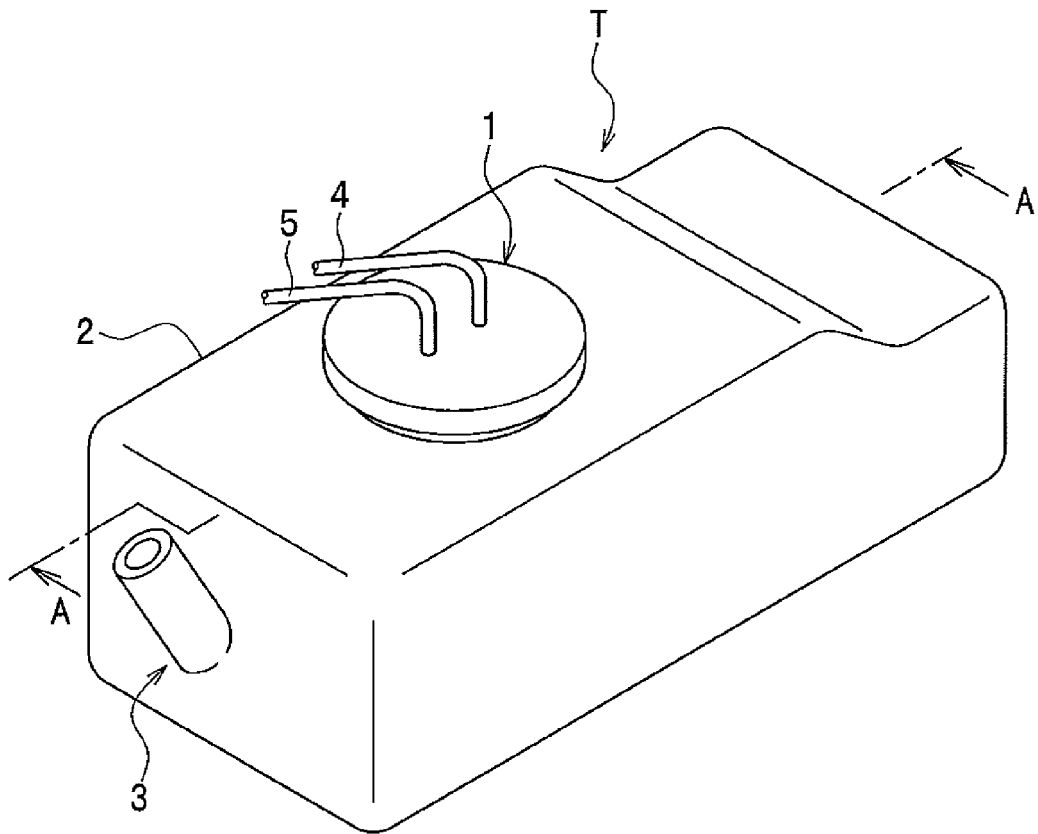
FIG. 1(a) is its perspective view.
Figure 1B:
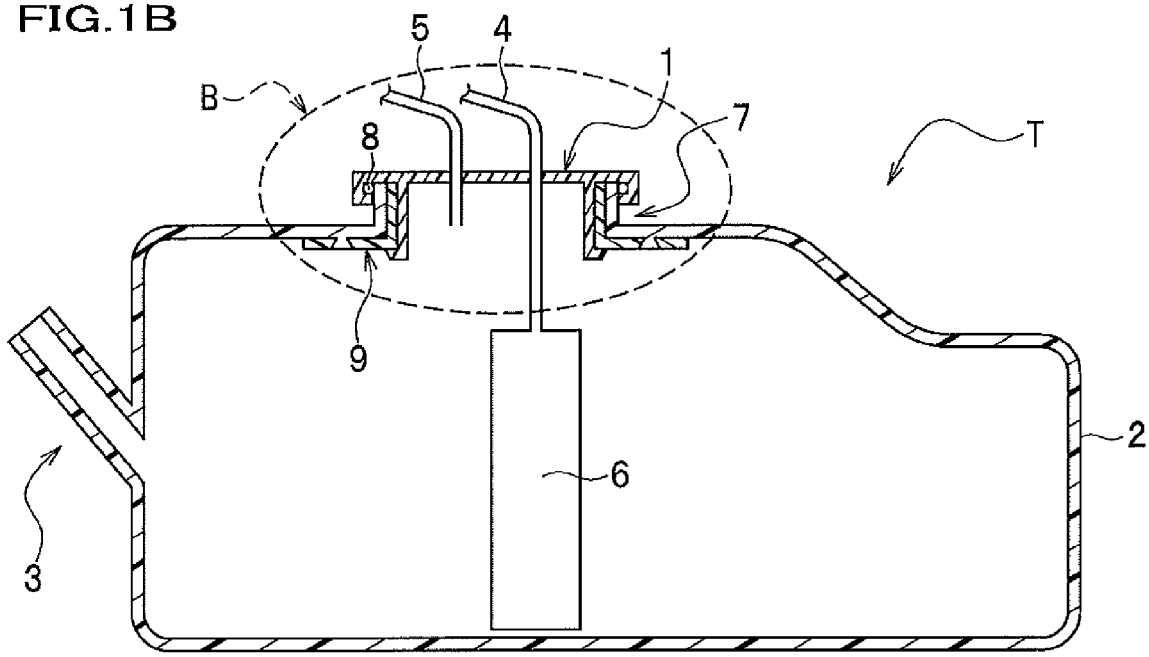
FIG. 1(b) is a longitudinal sectional view cut along the A-A line of FIG. 1(a).

FIG. 1 includes schematic diagrams illustrating a fuel tank having a seal structure according to the first embodiment (hereinafter, appropriately referred to as "a fuel tank according to the first embodiment"). FIG. 1(a) is a perspective view. FIG. 1(b) is a longitudinal sectional view cut along the A-A line of FIG. 1(a). As illustrated in FIGS. 1(a) and 1(b), a fuel tank T includes a resin-made tank body 2 and an opening section 7 disposed on the tank body 2. A lid member 1 is mounted on the opening section 7. Meanwhile, pump components such as a fuel supply passage 4 and a fuel return passage 5 are provided through the lid member 1. The fuel supply passage 4 supplies fuel fed by a fuel pump 6 (any known pump can be used) disposed inside the tank body 2 to an engine of, for example, an automobile. The fuel return passage 5 is used to return excessive fuel from the engine. In addition, the tank body 2 includes a connecting port 3 which is connected to a fuel supply opening disposed on the vehicle body of an automobile, etc.

Also, as illustrated in FIG. 1(b), the lid member 1 is inserted into (housed inside) a flange-equipped sleeve 9 which has been disposed inside the tubular opening section 7 of the fuel tank T. Furthermore, the fuel pump 6 is fixed via the fuel supply passage 4 to the lid member 1. Note that as used herein, the term "flange-equipped sleeve" refers to a tube (hollow column) having a flange. There is no restriction other than that configuration.

In the first embodiment, the lid member 1 having a pump module such as the fuel pump 6 is disposed on the fuel tank T. This configuration helps avoid welding for mounting the pump module on the fuel tank T and/or helps avoid a complicated fastening structure such as a thread section. Consequently, it is possible to fix the pump module to the fuel tank T by using a simple process and structure as described below.

Figure 2:
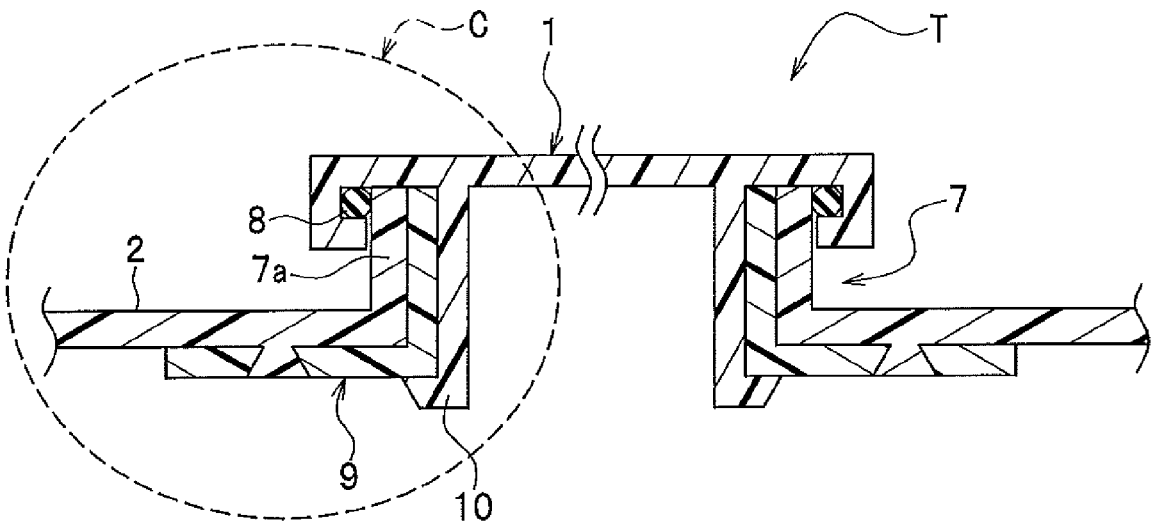
FIG. 2 is a sectional view enlarging a portion B of FIG. 1(b).

FIG. 2 is a sectional view enlarging a portion B of FIG. 1(b). As illustrated in FIG. 2, the fuel tank T has the opening section 7 with a neck section 7a (as described below), and the flange-equipped sleeve 9 is disposed inside the neck section 7a. Then, the lid member 1 is inserted into (i.e., closes) the opening section 7 via the flange-equipped sleeve 9. In addition, the flange-equipped sleeve 9 is fixed to the inner surface of the tank body 2. Also, a seal member 8, which is produced as an integrate part of the lid member 1, tightly attaches to the outer surface of the opening section 7 (i.e., the outer boundary; more specifically, the outer boundary of the neck section 7a included in the opening section 7).

Figure 3:
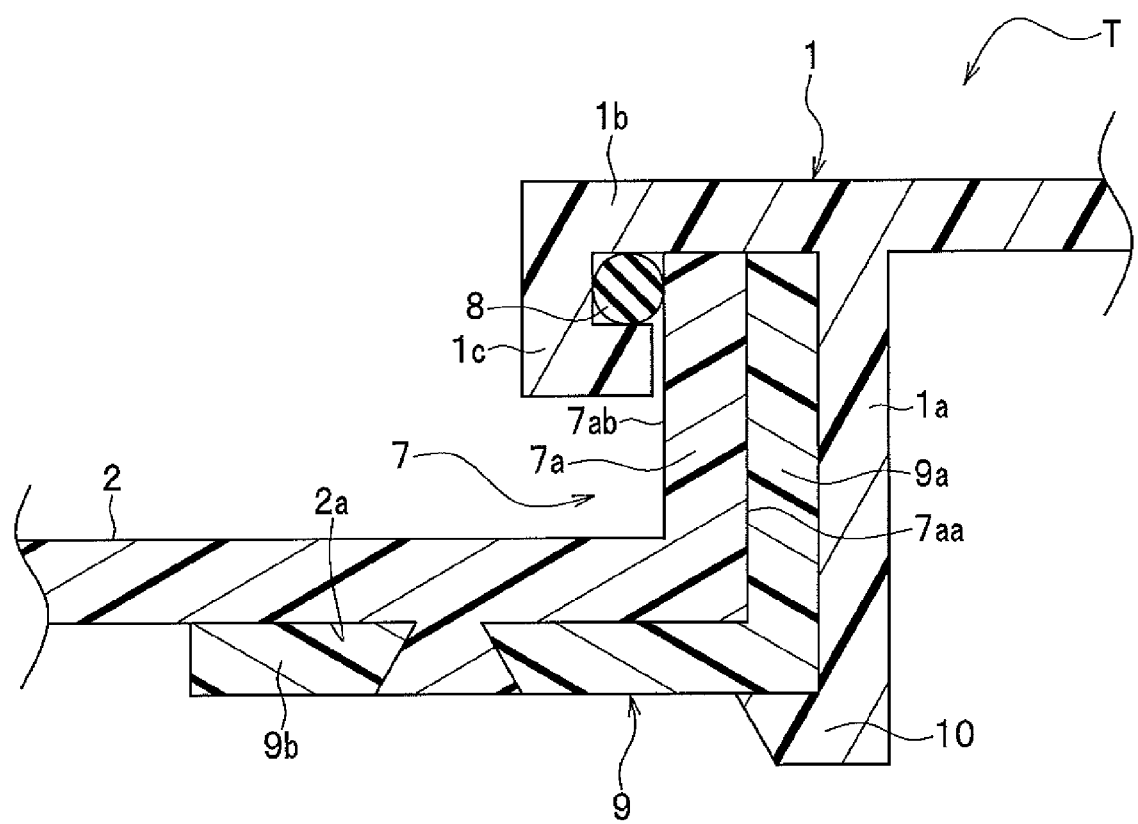
FIG. 3 is a sectional view enlarging a portion C of FIG. 2.

FIG. 3 is a sectional view enlarging a portion C of FIG. 2. As illustrated in FIG. 3, the opening section 7 includes the neck section 7a. The inner side of the neck section 7a is designated as an inner surface 7aa, and the outer side of the neck section 7a is designated as an outer surface 7ab. In addition, the lid member 1 includes a tubular section 1a, an external flange section 1b, and a seal-member mounting section 1c. The tubular section 1a is formed in parallel or substantially parallel to the inner surface 7aa of the neck section 7a. The external flange section 1b is formed on the upper end of the tubular section 1a. The seal-member mounting section 1c has an L-shaped cross-section and houses an annular seal member (e.g., an O-ring) 8 disposed under the outer edge of the external flange section 1b. Also, the flange-equipped sleeve 9 includes a tubular sleeve section 9a and an internal flange section 9b. The internal flange section 9b is attached to the inner surface 2a of the tank body 2. Further, a bottom section 10 of the tubular section 1a is interlocked with the flange-equipped sleeve 9.

In the first embodiment, such a structure makes a fastening structure such as a thread section unnecessary, which saves labor to control tightening torque during fastening and/or axial screw force, etc. This achieves higher sealing performance. In addition, its size can be more precisely controlled.

Also, this structure makes it possible to produce a seal structure that is easy to control attachment and detachment of the lid member 1. Moreover, the thickness of the opening section 7 can be made uniform, and the fuel tank T can be made to weigh light.

When the lid member 1 closes the opening section 7 of the resin-made tank body 2, the opening section 7 (the opening of the flange-equipped sleeve 9) houses the tubular section 1a of the lid member 1. Specifically, the tubular section 1a of the lid member 1 contacts the sleeve section 9a of the flange-equipped sleeve 9. That is, the tubular section 1a is housed inside the sleeve section 9a. The thickness (i.e., the length in the horizontal direction of the page of FIG. 3) and the length (i.e., the length in the vertical direction of the page of FIG. 3) of the tubular section 1a are not particularly limited. When the thickness is too thin, however, the strength of the lid member may decrease. When the thickness is too thick, the manufacturing cost of the lid member 1 may increase. In addition, as described above, the length of the tubular section 1a is not particularly limited. When the length is too short, however, the lid member 1 may not be disposed. When the length is too long, the fuel tank T of an automobile may occupy an excessively large volume.

In this regard, however, in the first embodiment, the bottom section 10 of the tubular section 1a has a snap-fit structure as illustrated in FIG. 3. Accordingly, the tubular section 1a has a longer length than the sleeve section 9a. Because the tubular section 1a has a longer length than the sleeve section 9a and the bottom section 10 of the tubular section 1a has a snap-fit structure, the bottom section 10 can be interlocked with the flange-equipped sleeve 9. Such a structure of the bottom section 10 enables the opening section 7 to be easily and tightly sealed by the lid member 1.

As used herein, the term "snap-fit structure" refers to a structure in which elastic force is used to interlock the tubular section 1a with a corner of the flange-equipped sleeve 9 (i.e., a corner at which the sleeve section 9a and the internal flange section 9b intersect). Specifically, when the lid member 1 is inserted into the opening section 7 disposed on the inner surface 7aa of the flange-equipped sleeve 9, the tubular section 1a is bent toward the opposite side (i.e., the right direction of the page of FIG. 3) of the flange-equipped sleeve 9. Next, when the external flange section 1b of the lid member 1 contacts the upper end of the neck section 7a, the above flexure returns to its original position. Then, the bottom section 10 is interlocked with the flange-equipped sleeve 9 to mount the lid member 1 on the tank body 2.

The external flange section 1b of the lid member 1 is integrated with the tubular section 1a and formed on the upper end of the tubular section 1a. In addition, the external flange section 1b is produced as a closure flange, and closes the upper end of the tubular section 1a (in this connection, the below-described internal flange section 9b does not provide a closure). Then, the external flange section 1b comes into contact with the upper ends of both the neck section 7a and the sleeve section 9a as illustrated in FIG. 3. The size (diameter) of the external flange section 1b is not particularly limited. The size should be larger than the size (diameter) of the neck section 7a, and should be large enough to be able to include the seal-member mounting section 1c that houses the annular seal member 8. In addition, the thickness of the external flange section 1b is also not particularly limited. When the thickness is too thin, the strength of the lid member 1 may decrease. When the thickness is too thick, the manufacturing cost of the lid member 1 may increase.

Under the outer edge of the external flange section 1b is the seal-member mounting section 1c which surrounds the seal member 8. The seal-member mounting section 1c and the external flange section 1b become one member. One of the directions (i.e., the right direction of the page of FIG. 3) has an opening. At the opening, the seal member 8 and the outer surface 7ab of the neck section 7a are tightly attached each other. That is, the inner circumference of the seal member 8 closely contacts the outer surface 7ab of the neck section 7a. Note that such a close contact can be achieved by deformation of the seal member 8 interposed between the seal-member mounting section 1c and the outer surface 7ab.

The size of the seal-member mounting section 1c is also not particularly limited. As shown in FIG. 3, the first embodiment employs a seal member whose cross-section is circular. To the top of the circle in the cross-section of the seal member 8 is tightly attached the external flange section 1b. To the circle in the left and bottom directions of the page of FIG. 3 is tightly attached the seal-member mounting section 1c. Such a configuration of the seal-member mounting section 1c can make its production easy and can further allow a useless space inside the seal-member mounting section 1c to be reduced. Besides, the seal member 8 can be made to attach to the outer surface 7ab of the opening section 7 more tightly.

Meanwhile, regarding the tight attachment between the seal member 8 and the outer surface 7ab, a degree of the above attachment is not particularly limited. The configuration of the seal member 8 may be adjusted so as to achieve an attachment pressure and attachment area equivalent to those of a typical seal member which is used to prevent fuel leakage.

As illustrated in FIG. 3, the sleeve section 9a of the flange-equipped sleeve 9 is interposed between the inner surface 7aa of the neck section 7a and the tubular section 1a of the lid member 1. The internal flange section 9b of the flange-equipped sleeve 9 contacts (i.e., tightly attaches to) the inner surface 2a of the tank body 2. A way to contact is not particularly limited. However, the junction is formed as illustrated in FIG. 3 by a method including: flowing a resin, which constitutes the tank body 2, into a space whose cross-section looks like a trapezoid (the space corresponding to a connecting-member attachment section 20a described below) disposed in the flange-equipped sleeve 9; and curing the resin. The thickness (in the vertical direction of the page of FIG. 3) and the length (in the horizontal direction of the page of FIG. 3) of the internal flange section 9b are not particularly limited. They may be determined so as to allow the flange-equipped sleeve 9 to tightly contact the tank body 2.

A fuel tank T according to the first embodiment includes the lid member 1, the tank body 2, and the flange-equipped sleeve 9. Any of the components is made of a resin. In this regard, however, the tank body 2 according to this embodiment is produced by blow molding, so that the resin, which constitutes the tank body 2, should have thermoplasticity (i.e., a thermoplastic resin). In addition, the resin constituting the flange-equipped sleeve 9 may be a thermoplastic or thermoset resin. When a thermoplastic resin is used as a resin constituting the flange-equipped sleeve 9, however, the melting point of the thermoplastic resin used should be higher than that of the resin constituting the tank body 2.

Specific types of the resin constituting the lid member 1, the tank body 2, and the flange-equipped sleeve 9 are not particularly limited. In this embodiment, however, the melting point (i.e., a heat-resistant temperature) of the resin constituting the flange-equipped sleeve 9 is higher than that of the resin constituting the tank body 2. The following describes a combination of the resins having such a melting point relationship. Examples of the resin that can be used to constitute the tank body 2 include polyethylene. Examples of the resin that can be used to constitute the flange-equipped sleeve 9 include nylon and polyacetal. Note that the above melting point can be measured with a differential scanning calorimeter in accordance with JIS K7121.

In addition, examples of the resin that can be used to constitute the lid member 1 include polyethylene. Note that any additive may be added, as needed, to the lid member 1, the tank body 2, and the flange-equipped sleeve 9 so as to enhance, for example, strength, thermostability, and/or weather resistance. Also, one kind of the resin may be used solely, or two or more kinds of the resin may be used in any ratio and combination.

A resin-made tank body 2 of a fuel tank T according to the first embodiment is produced by blow molding. In the blow molding, while its step is simple and the appearance and size of the product can be readily controlled, drawdown of the resin may occur. Unfortunately, it is difficult to control the internal (i.e., a surface not contacting a mold) shape and size, etc., of the product. Accordingly, when a conventional lid member is used to seal a fuel tank, which has the tank body 2 produced by, for example, blow molding, the size of the inner surface (corresponding to the inner surface 7aa in FIG. 3) of the opening section contacting the lid member is not precisely controlled. This may cause a significant gap between the lid member and the opening section of the fuel tank after sealing.

Nevertheless, in the fuel tank T according to the first embodiment, the inner diameter of the sleeve section 9a of the flange-equipped sleeve 9 is precisely controlled. Accordingly, the lid member 1 is disposed inside the opening section 7 via the flange-equipped sleeve 9 contacting the tank body 2 (i.e., lid member 1 closes the opening section 7). As a result, the tubular section 1a of the lid member 1 is made to closely contact the sleeve section 9a of the flange-equipped sleeve 9. Hence, this embodiment has an advantage that a gap is unlikely to occur compared with a seal structure of a conventional fuel tank and its size is more precisely controlled.

In addition, conventionally, a seal member is disposed inside the opening section (see Patent Documents 1 and 2). Because of that, fuel inside a fuel tank directly reaches the seal member, so that fuel leakage cannot be prevented by the seal member and additional measures should be in place. The seal structure of the fuel tank according to the first embodiment, however, has the flange-equipped sleeve 9 therebetween, which definitely reduces an amount of fuel that can leak out of the tank (i.e., can reach the seal member 8). Even if fuel leaks through a small gap which can exist between the tubular section 1a and the sleeve section 9a, the seal member 8 can further prevent fuel from leaking outside. In addition, when an O-ring is used as a seal member to form a shaft seal structure, control of tightening torque and axial screw force is unnecessary. This makes it possible to readily produce the structure and to provide stable sealing performance.

The following describes how to produce a seal structure for a fuel tank according to the first embodiment by referring to FIG. 4. FIG. 4 illustrates how to produce a seal structure for a fuel tank according to the first embodiment. FIG. 4(a) is a schematic diagram illustrating a state immediately before a connecting member 20 is made to tightly attach via a resin constituting a tank body 2 to a mold 21. The connecting member 20 is interlocked with a protrusion 22a of a core 22. FIG. 4(b) is a schematic diagram illustrating a state in which the connecting member 20 is mounted on the surface of the tank body 2. FIG. 4(c) is a schematic diagram illustrating a state after the mold 21 has been removed from the state of FIG. 4(b). FIG. 4(d) is a schematic diagram illustrating a state immediately before the tank body 2 and the connecting member 20, which have been removed from the mold 21, are cut.

Figure 4C:
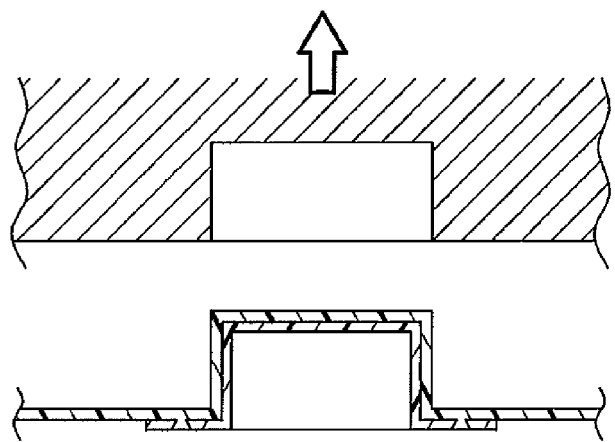
FIG. 4(c) is a schematic diagram illustrating a state after the mold 21 has been removed from the state of FIG. 4(b).
Figure 4B:
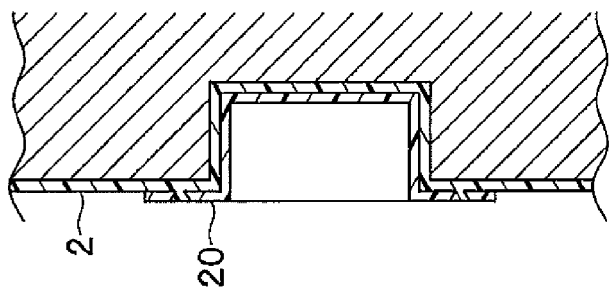
FIG. 4(b) is a schematic diagram illustrating a state in which the connecting member 20 is mounted on the surface of the tank body 2.
Figure 4A:
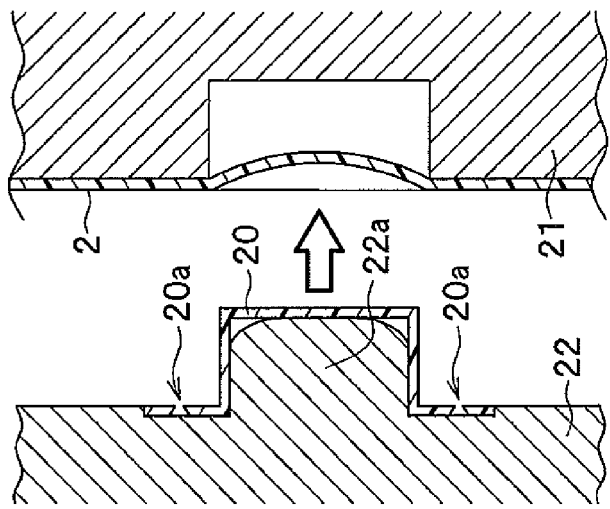
FIG. 4(a) is a schematic diagram illustrating a state immediately before a connecting member 20 is made to tightly attach via a resin constituting a tank body 2 to a mold 21. The connecting member 20 is interlocked with a protrusion 22a of a core 22.
Figure 4E:
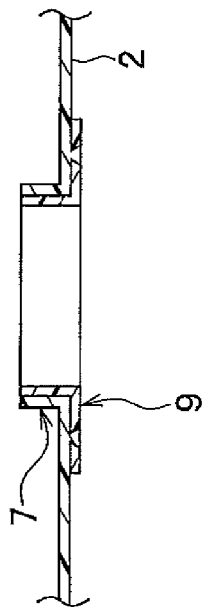
FIG. 4(e) is a schematic diagram illustrating a state in which an opening section 7 is formed by cutting in FIG. 4(d).
Figure 4D:
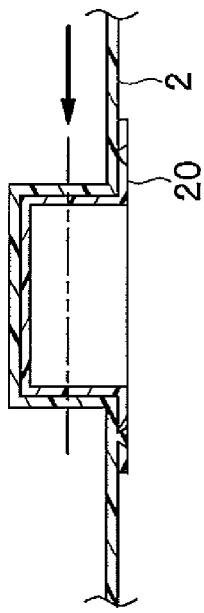
FIG. 4(d) is a schematic diagram illustrating a state immediately before the tank body 2 and the connecting member 20, which have been removed from the mold 21, are cut.

FIG. 4(e) is a schematic diagram illustrating a state in which an opening section 7 is formed by cutting in FIG. 4(d).

First, a resin-made sheet (not shown), a connecting member 20, and a mold 21 which can fit into the connecting member 20 are used to perform blow molding. This makes it possible to produce a tank body 2 having the connecting member 20 over the surface of the mold 21 (those members are described below). Specific process for blow molding are not particularly limited, and any known blow molding can be carried out. For example, the blow molding can be performed according to a process disclosed in JP-S48-62858A.

The following illustrates the connecting member 20. The connecting member 20 has a hat-shape. The term "hat-shape" refers to a shape in which the first end in a cylinder is covered with a plane and the second end has a flange. In addition, the flange of the connecting member 20 has connecting-member attachment sections 20a, whose cross-section looks like a trapezoid, disposed along a circumference direction with a predetermined interval. FIG. 4(a) shows a cross-section of the connecting member 20.

Then, the flange-equipped sleeve 9 is a part of the connecting member 20 (the following describes the specific details with reference to FIGS. 4(a) to (e)). Accordingly, the size of the connecting member 20 is preferably controlled with high precision in advance.

Furthermore, a process for producing the connecting member 20 having a size controlled with high precision in advance is not particularly limited. The process, however, may preferably include a process for production by injection molding using a mold in view of high size precision, versatile manufacturing technique, and simplicity.

The following details the above process with reference to FIGS. 4(a) to (e). FIG. 4(a) illustrates how the connecting member 20 fits into the mold 21 via a resin constituting the tank body 2 during blow molding. Note that in FIG. 4(a), a surface contacting the mold 21 becomes the outer surface of the tank body 2 after cure, and a surface not contacting the mold 21 becomes the inner surface of the tank body 2 after the cure. At this time point, the tank body 2 is yet to be cured, and remains melted while keeping a heating condition.

Then, FIG. 4(a) illustrates that the mold 21 is tightly attached via the resin constituting the tank body 2 to a core 22 on which the connecting member 20 having a hat-shape is made to be interlocked with a protrusion 22a. Note that in FIG. 4(a), the shape of the protrusion 22a is not completely tubular. In order to make it easy to interlock the connecting member 20 with the protrusion 22a, the protrusion 22a has an arc-shaped tip.

Note that the size and shape of the protrusion 22a of the core 22 is not necessarily controlled. They may be determined so as to mount the connecting member 20 in a way to fit the connecting member 20 into a predetermined position of the mold 21. That is, the size (diameter) of the opening section 7 is determined by the connecting member 20.

A degree of the above attachment may be determined so as to have a desired thickness (in the horizontal direction of the page of FIG. 4(a)) of the tank body 2 formed on the surface of the mold 21. This tight attachment makes the connecting member 20 fit into the mold 21 via the tank body 2 (see FIG. 4(b)). Note that when the connecting member 20 fits into the mold, the resin constituting the tank body 2 remains a melted (or plastic) condition. Consequently, the tight attachment of the connecting member 20 to the melted resin (tank body 2) enables the melted resin constituting the tank body 2 to flow into the connecting-member attachment sections 20a. Next, cooling of the mold 21 in a condition as illustrated in FIG.

4(b) allows the mold 21 to be placed in a condition under which the tank body 2 is attached to the connecting member 20.

Then, the tank body 2 attached to the connecting member 20 is detached from the mold 21 (FIG. 4(c)). After that, as illustrated in FIG. 4(d), a wall section of the tank body 2, together with connecting member 20, is cut in parallel (i.e., in a direction indicated by the bold arrow in the figure) to the top face of the connecting member 20. This step can produce the opening section 7 having the flange-equipped sleeve 9 as illustrated in FIG. 4(e). Finally, the lid member 1 is inserted into the opening section 7 as so produced to be able to form a seal structure for a fuel tank according to the first embodiment.

A process for producing a seal structure for a fuel tank according to the first embodiment includes the above steps. This configuration makes it possible to produce a fuel tank's seal structure that can prevent fuel leakage more readily than conventional ones. Also, the size of the inner diameter of the opening section can be easily controlled. This makes it easier to design and produce a lid member which is inserted into the opening section. Furthermore, the thickness of the opening section can be made uniform, so that its manufacturing steps can be simplified.

Embodiments Modified from First Embodiment

Hereinabove, a seal structure for a fuel tank and a process for producing the seal structure according to an embodiment are described by referring to an example. However, they can be carried out by optionally modifying the above embodiment without departing the gist of the present invention.

For example, the opening section 7 is disposed in an upper portion of the fuel tank T as shown in FIGS. 1 and 2. The position of the opening section 7, however, is not limited to the upper portion of the fuel tank T. Examples of the position can include a lateral side of the fuel tank T.

In addition, regarding the seal structure for a fuel tank T according to the first embodiment, a snap-fit structure is used at the bottom section 10. The opening section, however, may be sealed without using such a structure. Specifically, the inner diameter of the opening section 7 after the flange-equipped sleeve 9 is disposed is made a little smaller than the outer diameter of the tubular section 1a. Then, the lid member 1 having the above tubular section 1a may be inserted into the opening section 7. Use of such a configuration makes it possible to seal the opening section 7 by using friction force generated between the tubular section 1a and the sleeve section 9a.

Figure 5A:
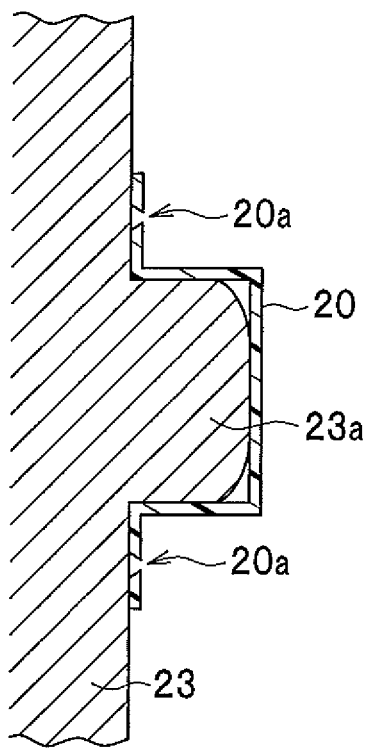
FIG. 5(a) is a schematic diagram in which a core 23 is successfully used as an alternative for the core 22.
Figure 5B:
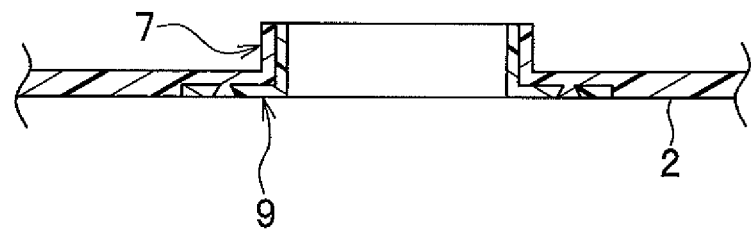
FIG. 5(b) is a schematic diagram showing a portion at or near the opening section 7 as produced by the same process as in the process for producing a seal structure for a fuel tank according to the first embodiment except using the core 23.

Also, as illustrated in FIG. 4(e), for example, the internal flange section 9b of the flange-equipped sleeve 9 is disposed on the surface (inner surface) of the tank body 2. The internal flange section 9b may be embedded in the tank body 2 as illustrated in FIG. 5(b) by using a core 23 (having a protrusion 23a) as illustrated in FIG. 5(a). Such a configuration has an advantage of making production of the core 23 easier.

Further, in the seal structure for a fuel tank according to the first embodiment, the opening section 7 is cylindrical. The shape of the opening section 7, however, may be like a square tube. Also, the shape of the external flange section 1b of the lid member 1 may differ from the shape of the opening section 7. Specifically, the shape of the external flange section 1b may be rectangular, and the shape of the opening section 7 may be cylindrical.

In addition, the shape of the connecting-member attachment section 20a is not limited to a trapezoidal cross-section. As long as the connecting member 20 (i.e., a flange-equipped sleeve 9) can be tightly attached to the inner surface of the tank body 2, any shape can be employed.

Furthermore, the seal-member mounting section 1c has an L-shaped cross-section in FIG. 3. But, the section may have an arc-shaped cross-section (i.e., ¼-arc-shaped cross-section). Moreover, the cross-section of the seal member 8 is circular in the first embodiment. The cross-section, however, can be rectangular.

Additionally, among processes for producing a seal structure for a fuel tank according to an embodiment, the first embodiment employs a resin-made sheet to produce the tank body 2. The form of the resin to produce the tank body 2, however, is not limited to the sheet. Specifically, for example, a resin-made hollow body, what is called a parison, may be used. Even if such a parison is used, a seal structure for a fuel tank according to an embodiment can be produced by performing a production process similar to that of the first embodiment.

Further, the shape of the protrusion 22a is not completely tubular in FIG. 4(a), but may be completely tubular. When such shapes are used, the connecting member 20 can be more tightly mounted on the protrusion 22a.

DESCRIPTION OF SYMBOLS

1 Lid member
1a Tubular section
1b External flange section
1c Seal-member mounting section
2 Tank body
2a Inner surface (Inner wall)
3 Connecting port
4 Fuel supply passage
5 Fuel return passage
6 Fuel pump
7 Opening section
7a Neck section
7aa Inner surface
7ab Outer surface (Outer boundary)
8 Seal member
9 Flange-equipped sleeve
9a Sleeve section
9b Internal flange section
10 Bottom section
20 Connecting member
20a Connecting-member attachment section
21 Mold
22 Core
22a Protrusion
23 Core
23a Protrusion
T Fuel tank

The invention claimed is:

1. A seal structure for a fuel tank comprising:
a resin-made tank body containing an opening section having a neck section, the neck section protruding to an outside of the tank;
a lid member closing the opening section; and
a flange-equipped sleeve being interposed between the neck section and the lid member,
wherein the lid member comprises:
a tubular section which is housed inside the opening section;
an external flange section which closes the top of the tubular section and is extended from the tubular section across an outer boundary of the neck section; and a seal-member mounting section which is extended downward from an outer edge of the external flange section and holds an annular seal member;

wherein the flange-equipped sleeve comprises:

a sleeve section which is attached to the neck section; and an internal flange section which is extended from the bottom of the sleeve section across the outer boundary of the neck section and is attached to an inner wall of the tank body;

wherein the flange-equipped sleeve contains a resin having a higher heat-resistant temperature than a resin constituting the tank body;

wherein when the lid member closes the opening section, the tubular section is housed inside the sleeve section;

wherein the external flange section comes into contact with the top of the neck section and the sleeve section; and wherein an inner circumference of the seal member is attached to the outer boundary of the neck section.

2. The seal structure according to claim 1, wherein a bottom section of the tubular section has a snap-fit structure, and the bottom section is interlocked with the flange-equipped sleeve.

3. A process for producing the seal structure for a fuel tank according to claim 1, comprising the steps of:

performing blow molding using a hat-shaped connecting member, a mold as produced to fit the connecting member into a predetermined position, and a resin to produce a tank body having the connecting member attached; and removing the tank body having the connecting member from the mold and cutting the connecting member, together with a wall section of the tank body, in parallel to a top face of the connecting member to produce an opening section of the tank body.

4. A process for producing the seal structure for a fuel tank according to claim 2, comprising the steps of:

performing blow molding using a hat-shaped connecting member, a mold as produced to fit the connecting member into a predetermined position, and a resin to produce a tank body having the connecting member attached; and removing the tank body having the connecting member from the mold and cutting the connecting member, together with a wall section of the tank body, in parallel to a top face of the connecting member to produce an opening section of the tank body.

* * * * *